United States Patent Office 2,855,277
Patented Oct. 7, 1958

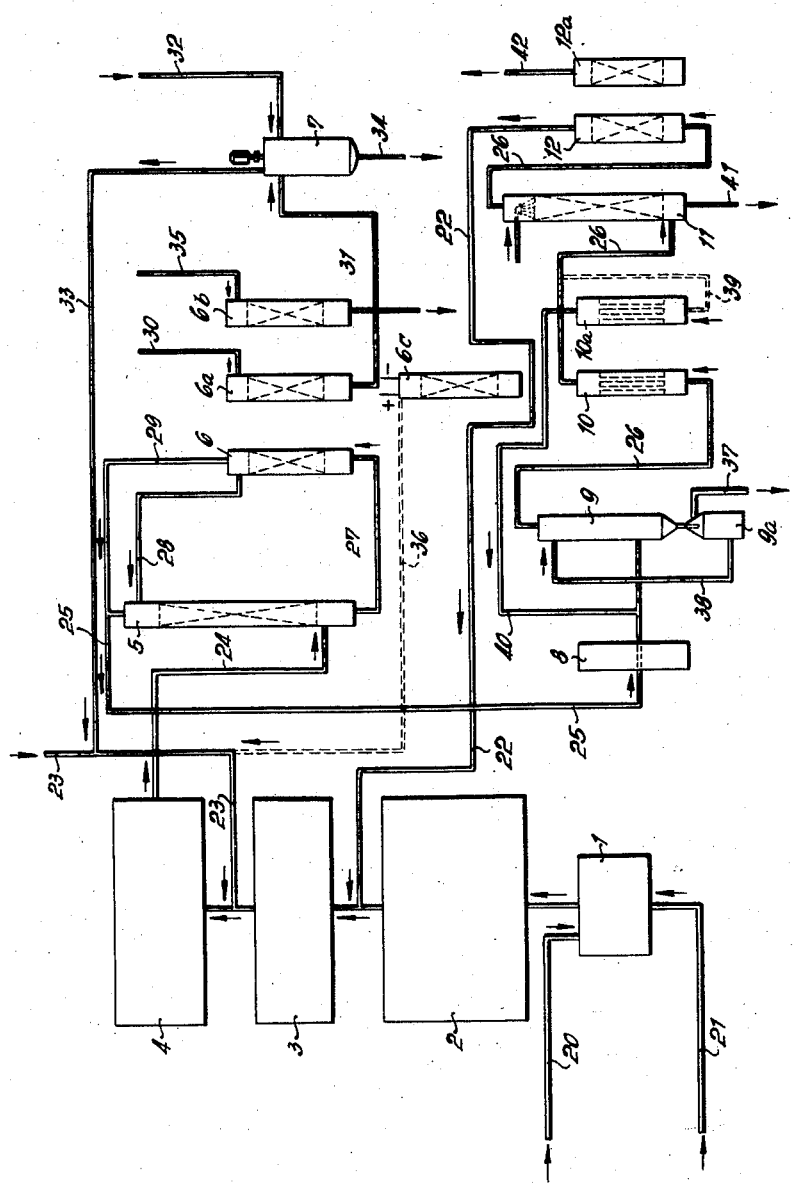

2,855,277

METHOD AND APPARATUS FOR THE TREATMENT OF GASEOUS MIXTURES RESULTING FROM THE SYNTHESIS OF HYDROCYANIC ACID

Werner Heinrich Wehrheim and Heinz Erich Becker, Bochum, and Hermann Kronacher, Trostberg, Germany Application August 16, 1954, Serial No. 449,852

12 Claims. (Cl. 23—151)

This invention relates to a method of and arrangement for decomposing gaseous mixtures resulting from the synthesis of hydrocyanic acid from carbon-containing gases, e. g. carbon monoxide, and ammonia.

With the customary method of producing hydrocyanic acid by direct synthesis of carbon-containing gases and ammonia with the use of catalyzers, it is known that in addition to hydrocyanic acid and such quantities of the starting gases, e. g. carbon monoxide and ammonia, as have not participated in the synthesizing operation, there are also obtained varying quantities of carbon dioxide, nitrogen and hydrogen, these quantities depending on the conditions under which the main reaction is conducted. Generally, the end gases, that is those gases which emerge from the synthesizing apparatus, are separated first from ammonia by a washing operation and then from hydrocyanic acid by a further washing operation. With the known method, however, the ammonia and the hydrocyanic acid are not obtained in a pure, or sufficiently pure state and they must be separated from other gaseous products, which are present, by apparatus especially provided for this purpose and in a relatively complicated manner. Furthermore, the known practice involves the use of large quantities of liquids in the successive washing operations for removing the ammonia and the hydrocyanic acid, and the regeneration or the disposal of these liquids correspondingly increases the working costs of the process.

It is an object of this invention to provide an improved method of and apparatus for decomposing gaseous mixtures resulting from the synthesis of the starting substances referred to, which will overcome the above mentioned drawbacks.

It is another object of this invention to provide a considerably simplified method of and device for decomposing gaseous mixtures resulting from the synthesis of hydrocyanic acid from carbon-containing gases and ammonia, which will make it possible considerably to reduce the quantities of liquids in the various washing operations for removing the ammonia and the hydrocyanic acid.

These and other objects and advantages of this invention will appear more clearly from the following specification in connection with the accompanying drawing diagrammatically illustrating an arrangement for carrying out the method according to the present invention.

According to the improved method of the present invention, the ammonia in a gaseous mixture resulting from the synthesis of hydrocyanic acid from carbon-containing gases and ammonia is removed by washing the mixture with a solution of hydrocyanic acid, and the hydrocyanic acid is subsequently extracted from the mixture.

Further according to the invention the subsequent extraction of hydrocyanic acid is effected by subjecting the mixture to the action of a condensing agent.

A still further feature of the invention consists in circulating the aqueous solution of hydrocyanic acid, used to wash ammonia from the mixture, in a closed circuit.

The condensing agent used for the extraction of hydrocyanic acid from the ammonia-freed mixture may be decalin. Hydrocyanic acid which remains in the residual gases after the treatment with a condensing agent may be removed in an absorber device, for example an activated-carbon filter. After a short working period, equilibrium establishes itself between the partial pressures of the hydrocyanic acid in the end gases of the synthesizing process and in the washing fluid so that the ammonia-freed residual gases have the original hydrocyanic acid content. The separation of the ammonia from these end gases with the assistance of the aqueous solution of hydrocyanic acid is effected in a quantitative manner without the washing out of the other components of the gas. Through suitable treatment of the ammonia-enriched hydrocyanic acid solution, the ammonia is obtained in pure form and can, therefore, be returned to the synthesizing apparatus. Furthermore the hydrocyanic acid is also obtained in pure state in the condensing device with relatively small consumption of energy.

The regeneration of the ammonia enriched hydrocyanic acid solution flowing from the ammonia washing operation is effected, according to a further feature of the invention, with the assistance of a cation exchanger. This cation exchanger takes up the ammonia at least approximately in a quantitative manner and can after having been sufficiently charged be regenerated for instance by means of electrodialysis or by the application of heat. In connection herewith, the ammonia is obtained directly in gaseous form. It is also possible to expel the ammonia from the cation exchanger by means of a suitable acid, for example nitric acid, and subsequently, by treatment of the salt solution with a base stronger than ammonia, for example milk of lime, to liberate the ammonia in gaseous state. Thus, in both cases it is possible to return the gaseous ammonia to the synthesizing apparatus for arrangement.

The resulting water-vapor saturated gaseous ammonia is to be dried before being again used in the synthesizing apparatus. For the separation of the hydrocyanic acid from the residual gases which result from the ammonia washing operation and which have been dried in normal manner, it is sufficient to spray relatively small quantities of the fluid employed as the condensation agent into the residual gases. If this condensation is effected at sufficiently low temperatures, the hydrocyanic acid is for the most part separated out from the residual gases in a quantitative manner. If some remainders of hydrocyanic acid are still present in the resulting gaseous mixture, it is sufficient to use a relatively small adsorption device, for example an activated carbon filter, for extracting such hydrocyanic acid. The hydrocyanic acid containing gas or vapor mixture which results from the usual regeneration of the adsorption device can again be added to the residual gas from the ammonia washing operation either before or after the drying process.

If the synthesizing process is carried out with carbon monoxide and ammonia, the residual gas will, after the hydrocyanic acid has been extracted, contain carbon dioxide and carbon monoxide as well as hydrogen and a little nitrogen. The residual gas can, in the usual manner, be first freed from carbon dioxide and then also from hydrogen, for example by activated carbon at low temperature. The carbon monoxide, which may still contain nitrogen, is returned to the synthesizing apparatus, so that all the undecomposed starting substances are recovered. The invention provides the special advantage that a particular washing fluid is used for the separation of the unreacted ammonia from the end gases of the synthesizing operation. The aqueous hydrocyanic solution, which is used for this purpose, appears directly as such at the outlet from the ion exchanger device. It can also easily be produced by mixing with water the hydrocyanic acid extracted from the decalin.

Referring now to the drawing, it is assumed for purposes of example that the process carried out by the arrangement shown therein employs carbon monoxide and ammonia as starting gases. The carbon monoxide which is a component of the starting gases for the hydrocyanic acid synthesizing process is produced in a gas generator 1. In this generator, coke, which is fed by a device generally designated by the reference 20, is gasified with the aid of oxygen which is introduced through a pipe 21. The generator gas which contains mainly carbon monoxide is passed first into a purifying apparatus 2 where it is freed from mechanically entrained impurities and other undesired components. Subsequently, the gas arrives in a drying apparatus 3. Before the cleaned generator gas enters the drying apparatus there can be added to it, by means of a pipe 22, carbon monoxide which may contain nitrogen and which is still present after the completion of the treatment, described below, of the gases from the synthesizing operation. Prior to entering a contact oven 4, the gas, which contains carbon monoxide, is mixed with the second component, that is the gaseous ammonia which is conveyed through a pipe 23.

In the contact oven 4 there is formed a synthesis end-gas which contains carbon dioxide, hydrogen and possibly some nitrogen in addition to hydrocyanic acid and the undecomposed residue of the starting gases, carbon monoxide and ammonia. This mixture of gases is conveyed to a washing tower 5 through a pipe 24 and through a heat exchanger, which is not shown and in which the sensible heat of the hot gas mixture is used to preheat the starting gases. In this tower 5, the gas mixture is freed quantitatively from ammonia at low temperature, preferably below 20° C., by means of an aqueous solution of hydrocyanic acid which is conveyed to said tower through a pipe 28. The thus treated gas mixture is then passed from the tower 5 to a condensing apparatus 9 through a pipe 25 and a drier 8.

In the condensing apparatus 9 there takes place an at least approximately quantitative separation of the hydrocyanic acid by treatment of the gas mixture by a suitable liquid, for example decalin which will not mix with hydrocyanic acid. A discharge pipe 26 leads the residual gases now freed from ammonia and hydrocyanic acid to a washing tower 11 via an adsorber device 10 which holds back the last remaining hydrocyanic acid and in which the carbon dioxide is extracted in known manner. After passing through a second adsorber 12 which retains the hydrogen in the residual gas, the remaining carbon monoxide, which may still contain some nitrogen, enters a return pipe 22. In this way the gas circuit is closed.

The ammonia-enriched aqueous solution of hydrocyanic acid flows from the washing tower 5 through a pipe 27 into an ion-exchanger 6 and, after having given off its ammonia in this exchanger, flows back in a closed circuit to the top of the washing tower 5 via a pipe 28. The gases, carbon dioxide and hydrocyanic acid, freed by charging the ion-exchanger 6 with ammonia, are added through a pipe 29 to the gas mixture flowing to the drier through the pipe 25.

In order to regenerate the ion-exchanger 6, a suitable acid, for example nitric acid, is introduced thereinto through a pipe 30, as indicated at 6a, and the resulting salt solution is conveyed through a pipe 31 to a container 7 which is provided with an agitator. By means of a base stronger than ammonia, for example milk of lime, which flows to the container 7 through a pipe 32, the ammonium nitrate solution is decomposed so that on one hand gaseous ammonia and on the other hand calcium nitrate in a usable state are obtained. The freed ammonia flows back via a pipe 33 to the ammonia main 23 while the calcium nitrate is drained off from time to time through a pipe 34 connected to the bottom of the container 7. After the regeneration with the acid it is advantageous to flush the ion-exchanger 6 with water which flows to the exchanger 6b, through a pipe 35. The decomposition of the salt solution formed by regenerating the exchanger by means of a base can be effected either semi- or wholly continuously. Instead of regenerating with an acid, the active mass of the exchanger 6 can be regenerated by electrodialysis, as indicated at 6c. In this way, the ammonia taken up by the exchange-mass is obtained directly in gaseous form and returns through a pipe 36 to the main pipe 23.

The separation of the hydrocyanic acid in the condensing apparatus 9 takes place at such a low temperature that the hydrocyanic acid condenses out and can be separated in liquid condition from the outflowing liquid mixture in a separator 9a. The produced hydrocyanic acid flows through a conduit 37 to a reservoir, whereas the separated condensation fluid is pumped back again to the tower through a pipe 38. The regeneration of the hydrocyanic acid adsorber 10 is effected, as shown at 10a, by means of a partial stream of the residual gases. This partial stream arrives via a branch pipe 39 at the adsorber 10a at a raised temperature after having been previously heated, and there it becomes charged with the adsorbed hydrocyanic acid and before again entering the hydrocyanic acid washing 9 it passes through a pipe 40 to the main gas stream. The carbon dioxide extracted from the residual gases in the washing tower 11 can be obtained in known manner from the wash liquid flowing out through a pipe 41 or from the solid adsorbing means, for example lime. The hydrogen extracted from the residual gases in the adsorber 12 is, as indicated at 12a, separately removed through a pipe 42 when the adsorber, after having been sufficiently loaded, is being regenerated. The ion-exchanger 6 and the adsorbers 10 and 12 respectively comprise in a manner known per se, two or more apparatus connected in parallel, of which one apparatus is respectively out of operation for regeneration of its mass.

It is, of course, understood that the present invention is, by no means, limited to the particular arrangement shown in the drawings but also comprises any modifications within the scope of the appended claims.

What we claim is:

1. A method for the treatment of gaseous mixtures resulting from the synthesis of hydrocyanic acid from carbon-containing gases and ammonia, for the recovery of ammonia and hydrocyanic acid therefrom, which comprises the steps of washing ammonia and hydrocyanic acid out of the end gases of the synthesis by an aqueous solution of hydrocyanic acid, resulting in a solution of ammonia, and a substantially ammonia-free solution of hydrocyanic acid together with residual gases, condensing said hydrocyanic acid together with said residual gases, at a temperature below the condensation temperature of hydrocyanic acid by means of a saturated higher cyclo hydrocarbon liquid in order to condense said hydrocyanic acid, and recovering said hydrocyanic acid from said liquid.

2. A method according to claim 1, in which condensation and recovery of the hydrocyanic acid from the substantially ammonia-free solution is effected by subjecting the mixture to the action of decalin.

3. A method according to claim 1, in which the removal of ammonia is effected by washing the mixture with an aqueous solution of hydrocyanic acid while circulating said aqueous solution of hydrocyanic acid in a closed circuit.

4. A method according to claim 1 in which the ammonia is removed quantitatively.

5. A method according to claim 1 in which said substantially ammonia-free solution of hydrocyanic acid together with residual gases, prior to condensation, is subjected to a drying operation.

6. A method according to claim 1 in which the remaining residual gases after condensation and recovery of said hydrocyanic acid are subjected to adsorption and recovery of carbon monoxide therefrom is effected.

7. A method according to claim 1 in which the remaining residual gases after condensation and recovery of said hydrocyanic acid are freed in successive operations from carbon dioxide and hydrogen.

8. A method according to claim 1 in which the remaining residual gases after condensation and recovery of said hydrocyanic acid are subjected to adsorption, recovery of carbon monoxide therefrom is effected, and said recovered carbon monoxide is recycled back to the synthesizing operation.

9. In a method for the treatment of gaseous mixtures resulting from the synthesis of hydrocyanic acid from carbon-containing gases and ammonia, for the recovery of ammonia and hydrocyanic acid therefrom, which comprises the steps of washing ammonia and hydrocyanic acid out of the end gases of the synthesis by an aqueous solution of hydrocyanic acid, resulting in a solution of ammonia, and a substantially ammonia-free solution of hydrocyanic acid together with residual gases, condensing said hydrocyanic acid together with said residual gases, at a temperature below the condensation temperature of hydrocyanic acid by means of a saturated higher cyclo hydrocarbon liquid in order to condense said hydrocyanic acid, recovering said hydrocyanic acid from said liquid, circulating said resulting solution of ammonia through an ion exchanger to separate said ammonia, and recycling said aqueous solution of hydrocyanic acid from which ammonia has been separated back to said washing operation.

10. A method according to claim 9 in which the ammonia is recovered from said ion exchanger.

11. A method according to claim 9 in which the ion exchanger is regenerated by electrodialysis and the ammonia is recovered therefrom.

12. In an apparatus for synthesizing hydrocyanic acid from carbon-containing gases and ammonia and for treatment of gaseous mixtures resulting therefrom, the improvement comprising in combination a synthesizing device, a first washing device provided with conduit means communicating with said synthesizing device and receiving the gaseous mixture therefrom, an ion exchange device, conduit means interconnecting said first washing device with said ion exchange device whereby said ion exchange device receives effluent aqueous solution from said first washing device, and further conduit means interconnecting said ion exchange device with said first washing device whereby said ion exchange device returns effluent solution to said first washing device, a drier, conduit means leading from said first washing device and from said ion exchange device to said drier, a condensing device containing a condensing agent, conduit means leading from said drier to said condensing device, a separator device, discharge means leading from said condensing device to said separator device, means for withdrawing separated hydrocyanic acid from said separator device, conduit means interconnecting said separator and said condensing device for recycling said condensing agent from said separator to said condensing device, a first adsorber device interconnecting said condensing device and a second washing device, a second adsorber, conduit means interconnecting said second absorber and said second washing device, and return conduit means leading from said second adsorber to said synthesizing apparatus.

References Cited in the file of this patent

UNITED STATES PATENTS

| | | |
|---|---|---|
| 1,954,973 | Zaniboni | Apr. 17, 1934 |
| 2,311,625 | Bransky | Feb. 23, 1943 |
| 2,409,861 | Hunter | Oct. 22, 1946 |
| 2,413,784 | Rawlings | Jan. 7, 1947 |
| 2,455,987 | Fallows | Dec. 14, 1948 |
| 2,550,446 | Blohm | Apr. 24, 1951 |
| 2,604,380 | Beekhuis | July 22, 1952 |
| 2,656,251 | Christmann | Oct. 20, 1953 |
| 2,723,184 | Creighton | Nov. 8, 1955 |
| 2,726,733 | Radke | Dec. 13, 1955 |
| 2,756,841 | Asendorf | July 31, 1956 |